UNITED STATES PATENT OFFICE 2,531,380

PREPARATION OF ALKALI METAL DI-SALTS OF 2:3 HYDROXYNAPHTHOIC ACID

Eric B. Higgins, Tewin Wood, England, assignor to Tewin Industries Inc., County of New York, N. Y.

No Drawing. Application March 31, 1949, Serial No. 84,760. In Great Britain April 5, 1948

6 Claims. (Cl. 260—520)

The invention relates to the preparation of 2:3 hydroxynaphthoic acid.

It has long been known that the acid can be prepared from beta-naphthol by treatment with $CO_2$ at a high temperature according to the Kolbe synthesis as described in Heyden's German patent specification No. 50,341 and represented by the general equation:

although the yields fall far short of the theoretical amount and there is considerable loss of material owing to the formation of tar and other useless by-products.

Despite the very unsatisfactory yields which do not exceed 36 to 37 per cent of the theoretical amount calculated upon the sodium naphtholate employed and the very considerable ultimate wastage of 13 to 20 percent of the beta-naphthol used, the process is the best hitherto available and the overwhelming majority, if not indeed the whole, of this important intermediate produced technically is made by this process. Many suggestions have been made of modifications in detail with the object of improving the process but the above-stated figures have not heretofore been improved upon.

It has now been found that, contrary to the previously accepted theory, the di-sodium salt of 2:1 hydroxynaphthoic acid is not resolved into its constituents when subjected to high temperatures of the order of 220 to 360° C., according to the present invention, in the absence of bodies containing free hydroxyls, but, on the contrary, it passes smoothly and substantially quantitatively to the 2:3 isomer.

As by the Kolbe process, free naphthol is unavoidably liberated, the essential condition that is to say, the absence of bodies containing free hydroxyl, cannot be fulfilled when that process is employed according to the previous practice.

The di-sodium salt of 2:1 hydroxynaphthoic acid can be produced with substantially quantitative yield from beta-naphthol as set forth in copending patent application S. N. 84,759, filed March 31, 1949 and the present invention provides a means of obtaining substantially quantitative yields of 2:3 hydroxynaphthoic acid from the 2:1 isomer.

In order that the invention may be more clearly understood and readily carried into effect, a number of particular methods of carrying out the invention will now be given merely by way of example.

Example 1

100 kilogms. of substantially pure di-sodium 2:1 hydroxynaphthoate is introduced into a vessel preferably provided with a stirring apparatus or capable of being rotated and from which oxygen has been excluded either by evacuation of the air or by the introduction of a non-actinic gas such as nitrogen or carbon-di-oxide or a non-actinic vapour, and the vessel then heated so that the material contained in it is brought to and maintained at a temperature between 220 and 360° C., precautions being taken to avoid local overheating. The 2:1 hydroxynaphthoate is converted to 2:3 hydroxynaphthoate, the rate of conversion depending upon the temperature employed. The necessary duration of the heating is controlled in accordance with analysis of the product. Conversion can be substantially quantitative. The reaction product is preferably allowed to cool and is then dissolved in water and the sodium salt decomposed—preferably when the solution is boiling, by the addition of hydrochloric acid. The practically insoluble 2:3 hydroxynaphthoic acid is filtered off, washed free of mineral acid and dried.

Example 2

100 kilogms. of disodium 2:1 oxynaphthoate substantially free from naphthol or other material containing free hydroxy-groups is mixed with 200 kilogms. of paraffin wax, medicinal paraffin or other chemically inert liquid having a boiling point higher than the temperature to be employed, in a vessel provided with an agitating mechanism and a heating jacket in which high pressure saturated steam, oil, diphenyl oxide or the like can be circulated and by means of which the reaction mass can be uniformly heated. The temperatures should fall in the range of 220 to 360° C. The agitated mixture is heated until tautomerisation is complete after which the mass is cooled, the di-sodium 2:3 hydroxynaphthoate extracted from the vehicle by water, and the aqueous extract treated as in Example 1.

Example 3

100 kilogms. of di-sodium 2:1 hydroxynaphthoate substantially free from impurities containing free hydroxyl groups is mixed with 300 kilogms. of tetrahydronaphthalene in a vessel as specified in Example 2 but provided with a reflux condenser and capable of being hermetically sealed and capable of enduring pressure. The tetrahydronaphthalene is brought to the boiling point under a superatmospheric pressure sufficient to raise the boiling point to within the range of 220 to 360° C., and the heating continued until tautomerisation is complete. The tetrahydronaphthalene is now distilled off and the dry residue treated as described in Example 1.

Commercially the di-sodium 2:1 hydroxynaphthoate may have been prepared from raw materials not completely free from impurity such as tar in which case it may prove desirable to filter the aqueous solution of sodium 2:3 hydroxynaphthoate from such impurities before precipitation of the free acid.

I claim:

1. A process for the preparation of an alkali metal di-salt of 2:3 hydroxynaphthoic acid, comprising the heating of an alkali metal di-salt of 2:1 hydroxynaphthoic acid at a temperature between 220° C. and 360° C., with substantial absence of material containing free hydroxyl groups and in a chemically indifferent atmosphere.

2. A process for the preparation of the di-sodium salt of 2:3 hydroxynaphthoic acid, comprising the heating of the di-sodium salt of 2:1 hydroxynaphthoic acid at a temperature between 220° C. and 360° C., with substantial absence of material containing free hydroxyl groups and in a chemically indifferent atmosphere.

3. A process for the preparation of an alkali metal di-salt of 2:3 hydroxynaphthoic acid, comprising the heating of an alkali metal di-salt of 2:1 hydroxynaphthoic acid at a temperature between 220° C. and 360° C., with substantial absence of material containing free hydroxyl groups, in a chemically indifferent atmosphere and in suspension in a chemically indifferent liquid.

4. A process for the preparation of the di-sodium salt of 2:3 hydroxynaphthoic acid, comprising the heating of the di-sodium salt of 2:1 hydroxynaphthoic acid at a temperature between 220° C. and 360° C., with substantial absence of material containing free hydroxyl groups, in a chemically indifferent atmosphere and in suspension in a chemically indifferent liquid.

5. A process for the preparation of an alkali metal di-salt of 2:3 hydroxynaphthoic acid, comprising the heating of an alkali metal di-salt of 2:1 hydroxynaphthoic acid at a temperature between 220° C. and 360° C., with substantial absence of material containing free hydroxyl groups, in an atmosphere consisting of a chemically indifferent gas and in suspension in a chemically indifferent liquid, the pressure of said indifferent gas being so adjusted as to cause said chemically indifferent liquid to have a boiling point between 220° C. and 360° C.

6. A process for the preparation of the di-sodium salt of 2:3 hydroxynaphthoic acid, comprising the heating of the di-sodium salt of 2:1 hydroxynaphthoic acid at a temperature between 220° C. and 360° C., with substantial absence of material containing free hydroxyl groups, in an atmosphere consisting of a chemically indifferent gas and in suspension in a chemically indifferent liquid, the pressure of said indifferent gas being so adjusted as to cause said chemically indifferent liquid to have a boiling point between 220° C. and 360° C.

ERIC B. HIGGINS.

REFERENCES CITED

The following references are of record in the file of this patent:

UNITED STATES PATENTS

| Number | Name | Date |
|---|---|---|
| 1,470,039 | Wallaeh | Oct. 9, 1923 |
| 1,503,984 | Cone | Aug. 5, 1924 |
| 1,648,839 | Calcott | Nov. 8, 1927 |
| 1,700,546 | Schwenk | Jan. 29, 1929 |
| 2,132,356 | Lecher | Oct. 4, 1938 |

OTHER REFERENCES

Krepelka et al., Chem. Abstracts, vol. 33, Col. 7294 (1939).